June 26, 1923.
C. W. KIRSCH
WINDOW SHADE ROLLER
Filed May 29, 1922
1,459,772
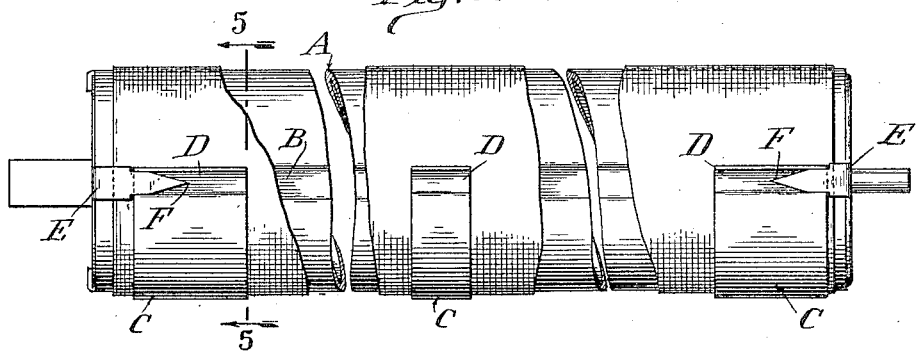
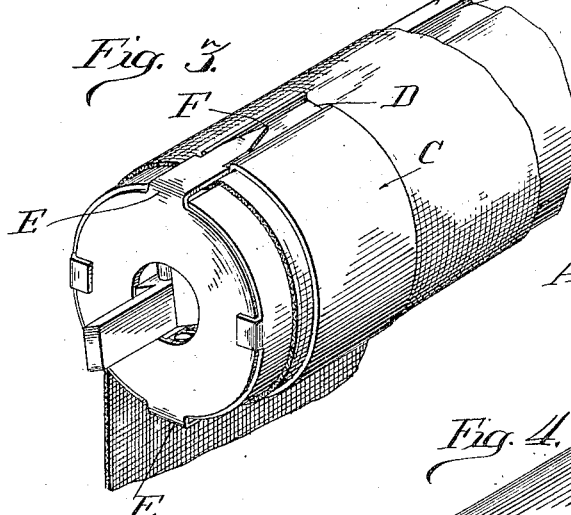
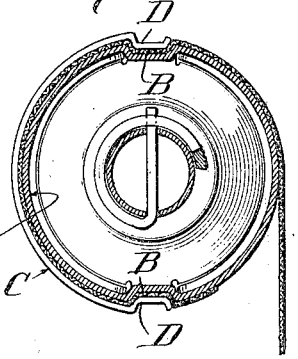
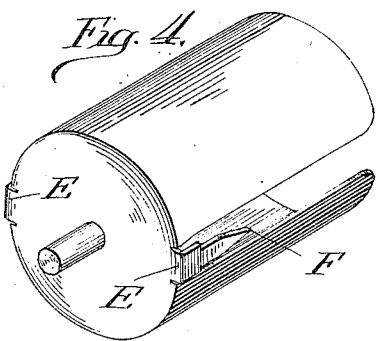
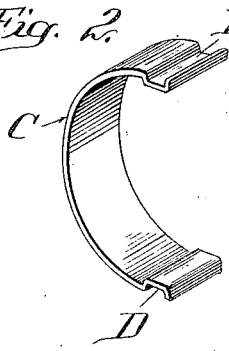
Inventor
Charles W. Kirsch
By Rudolph
Attorney Patented June 26, 1923.

1,459,772

UNITED STATES PATENT OFFICE.

CHARLES W. KIRSCH, OF STURGIS, MICHIGAN.

WINDOW-SHADE ROLLER.

Application filed May 29, 1922. Serial No. 564,334.

*To all whom it may concern:*

Be it known that I, CHARLES W. KIRSCH, a citizen of the United States, residing at Sturgis, in the county of St. Joseph and State of Michigan, have invented certain new and useful Improvements in Window-Shade Rollers, of which the following is a specification.

This invention has for its object to provide a window-shade roller equipped with means for removably securing a window-shade thereto very quickly, easily and accurately and positively holding the same against detachment from the roller under severe strain.

The invention consists in the features of construction and combination of parts hereinafter fully described and claimed.

In the accompanying drawings illustrating a suitable embodiment of the invention:—

Fig. 1 is a view in elevation of a shade roller constructed in accordance with the invention.

Fig. 2 is a perspective view of a fastening device for securing the window-shade to the roller.

Figs. 3 and 4 are perspective views of internal parts of the roller coacting with the fastening means exteriorly thereof to prevent dislodgement of the latter.

Figure 5 is a transverse section on the line 5—5 of Figure 1.

The present invention relates entirely to the external parts of a shade roller particularly adapted to firmly secure a window-shade thereto and prevent the accidental detachment thereof under severe strain. The same means are disclosed in a companion application for Letters Patent filed of even date herewith wherein said external means are described and claimed in their association with the spring-rewind mechanism for preventing the window-shade from being held or caught in a position from which the rewinding thereof cannot be started.

The fastening means of the present invention may be applied to shade rollers of all descriptions, regardless of what the internal mechanism thereof may be and it consists in providing the shade roller A with a pair of diametrically opposed longitudinal grooves B extending from end to end of the roller and which are adapted to receive and engage the extreme end portion and a contiguous portion of the window-shade. The walls of the grooves B present sharp corners where they meet the circumferential wall of the roller. Associated with the roller A and the said grooves B is a plurality of semi-cylindrical flexible metal fastening strips C having a radius very slightly larger than that of the roller A. Each of said members C is provided at its ends with diametrically opposed inwardly projecting U-shaped formations D which preferably coincide in contour with the grooves B and are adapted to engage in the latter to hold the portions of the window-shade opposed to said grooves depressed into the same, the spring of the members C exerting the requisite pressure to keep the shade-cloth from being withdrawn from said grooves. The number of said fastening members C employed will depend upon the length of the roller. The aforesaid sharp corners serve to prevent slippage of the shade-cloth out of engagement with the projections of the fastening strips.

The end walls of the roller A are provided with projections E extending into the ends of the grooves B and are preferably tapered so as to present relatively sharp points F between the side walls of said grooves. The U-shaped projections D of the fastening members C engaging the side edge portions of the window-shade are adapted after being mounted upon the roller in engagement with the shade-cloth, to be moved longitudinally of the roller until the said projections E extend into the channels of the projections D and the side edges of the projections E engage the side walls of said channels. The said fastening members engaging the side edge portions of the window-shade are thus held rigidly in place and are rendered incapable of being expanded and thus sprung out of the grooves to release the window-shade from the roller, by strain on the latter.

Practically all window-shades are equipped in their lower edge portions with a cross-bar for distributing the strain on the window-shade and the latter is usually engaged at or below the elevation of the cross-bar in raising and lowering it. Consequently it is practically impossible to put a strain on the middle portion of the window-shade in excess of that on the side edge portions thereof which might serve to dislodge the fastening members C disposed between the side edge portions of the window-shade so that the projections E serve to prevent detachment of all of said fastening devices.

The window-shade may be easily and quickly detached from the roller when desired to effect cleansing thereof or for any purpose and may furthermore be easily replaced and accurately positioned by unskilled persons for the reason that the grooves serve as guides to accurately dispose the edge portion of the shade on the roller and as this edge usually extends accurately perpendicularly to the side edges, it follows that when said top edge is accurately positioned with respect to the grooves, the side edge portions will be disposed perpendicularly to the axis of rotation of the roller so that if the latter is a true cylinder mounted to rotate on its axis, the window-shade will roll up accurately with respect to the position of its side edges relatively to the cylinder ends.

While I have shown the preferred embodiment of the invention in the accompanying drawings, it will be understood of course that such embodiment may be changed and varied in details of construction without departing from the invention as defined in the appended claims.

I claim as my invention:

1. A window shade roller provided with a longitudinal groove in its outer face extending from end to end thereof into which the shade cloth is adapted to be depressed, a plurality of arcuate spring members adapted to yieldably engage the roller and terminating at one end in projections adapted to engage in said groove for holding the shade cloth engaged therein, said spring members slidable longitudinally of the roller when mounted thereon and projections extending into the ends of the groove and adapted to engage over the projections of the spring members disposed contiguous to the ends of the roller for preventing escape of said projections from said groove.

2. A window shade roller provided in its outer face with a groove extending from end to end thereof, the walls of said groove presenting sharp corners where they meet the circumferential face of the roller, projections extending into the ends of said groove, spaced from the bottom and side walls thereof, a plurality of arcuate spring members adapted to yieldably embrace the roller and each terminating at one end in a projection adapted to engage in said groove the shade adapted to be depressed at one end portion into said groove and held engaged therein by the projections of said spring members, the latter slidable longitudinally of the roller while engaged with the shade whereby the members nearest adjacent the ends of the roller may be moved to bring the projections thereof into engaging relation to the projections extending into the ends of said groove, the latter preventing said projections from being sprung out of said groove, the sharp corners aforesaid coacting with said spring members to prevent slippage of the shade.

3. A shade roller provided with a pair of substantially diametrically opposed longitudinal grooves extending the entire length thereof and adapted to receive and engage portions of a window-shade depressed into the same, flexible, semi-cylindrical fastening devices corresponding in radius substantially with the circumferential wall of the roller provided at their ends with channeled projections adapted to engage in said grooves to hold the shade-cloth depressed into the latter, and projections extending from the ends of the roller inwardly into said grooves for engaging and snugly fitting the channels of the projections of the endmost fastening devices for holding the latter against dislodgement from said grooves, said fastening devices slidable longitudinally of the roller into and out of engaging relation to the said projections.

CHARLES W. KIRSCH.